(12) United States Patent
Weber

(10) Patent No.: US 6,316,841 B1
(45) Date of Patent: Nov. 13, 2001

(54) INTEGRATED EMERGENCY POWER AND ENVIRONMENTAL CONTROL SYSTEM

(75) Inventor: Kent Weber, Seattle King, WA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/489,145

(22) Filed: Jan. 21, 2000

(51) Int. Cl.[7] ............................. F01C 13/00; F01D 15/00
(52) U.S. Cl. ........................ 290/4 R; 290/4 C; 290/4 D; 62/33; 62/236; 62/239; 62/331; 244/118.5
(58) Field of Search .................................. 290/4 C, 4 R, 290/4 D; 62/236, 239, 33; 244/118.5

(56) References Cited

U.S. PATENT DOCUMENTS

| | | | |
|---|---|---|---|
| 4,261,416 | 4/1981 | Hamamoto | 165/23 |
| 4,419,926 | 12/1983 | Cronin et al. | 98/1.5 |
| 4,494,372 | 1/1985 | Cronin | 60/39.07 |
| 4,684,081 | 8/1987 | Cronin | 244/58 |
| 4,706,908 | 11/1987 | Huffman et al. | 244/118.5 |
| 4,979,362 | 12/1990 | Vershure, Jr. | 60/39.142 |
| 5,137,230 | 8/1992 | Coffinberry | 244/118.5 |
| 5,239,830 * | 8/1993 | Banthin et al. | 60/718 |
| 5,299,763 | 4/1994 | Bescoby et al. | 244/118.5 |
| 5,403,155 * | 4/1995 | Head et al. | 416/25 |
| 5,442,905 | 8/1995 | Claeys et al. | 60/39.07 |
| 5,490,645 | 2/1996 | Woodhouse | 244/118.5 |
| 5,709,103 | 1/1998 | Williams | 62/402 |
| 5,791,982 | 8/1998 | Curry et al. | 454/74 |
| 5,813,630 | 9/1998 | Williams | 244/188.5 |
| 5,899,085 * | 5/1999 | Williams | 62/236 |

OTHER PUBLICATIONS

Integrated Power Systems for Future Transport Aircraft (1997) by Kenneth R. Williams.
T/EMM/Engine Integration.
Integrated Power Package In–Flight Mode, Fan Make–Up.

* cited by examiner

Primary Examiner—Elvin Enad
(74) Attorney, Agent, or Firm—Wood, Phillips, VanSanten, Clark & Mortimer

(57) ABSTRACT

Environmental control and electric power are provided for a vehicle (12) carrying at least one gas turbine engine (14, 16) including a turbine (40,46) and a compressor (42,48); a stored energy device (28); a first turbine (64) powered by the stored energy device (28); an expansion turbine (60) for an air cooling cycle; and an electric generator (34) rotatably driven by the first turbine (64) and the expansion turbine (60). The electric generator (34) has a minimum operating speed required to generate acceptable electric power for the vehicle (12). The environmental control and electric power for the vehicle (12) are provided by a method including the steps of normally rotating the expansion turbine (60) with bleed air from the compressor (42,48) of the at least one gas turbine engine (14, 16) to generate temperature conditioned, pressurized air for the environmental control of the vehicle; driving the electric generator (34) above the minimum speed with the expansion turbine (60) to provide electric power for the vehicle (12); and, in the absence of sufficient power from the expansion turbine (60), maintaining the electric generator (34) above the minimum speed by powering the first turbine (64) with the stored energy device (28) to provide electric power for the vehicle (12).

10 Claims, 4 Drawing Sheets

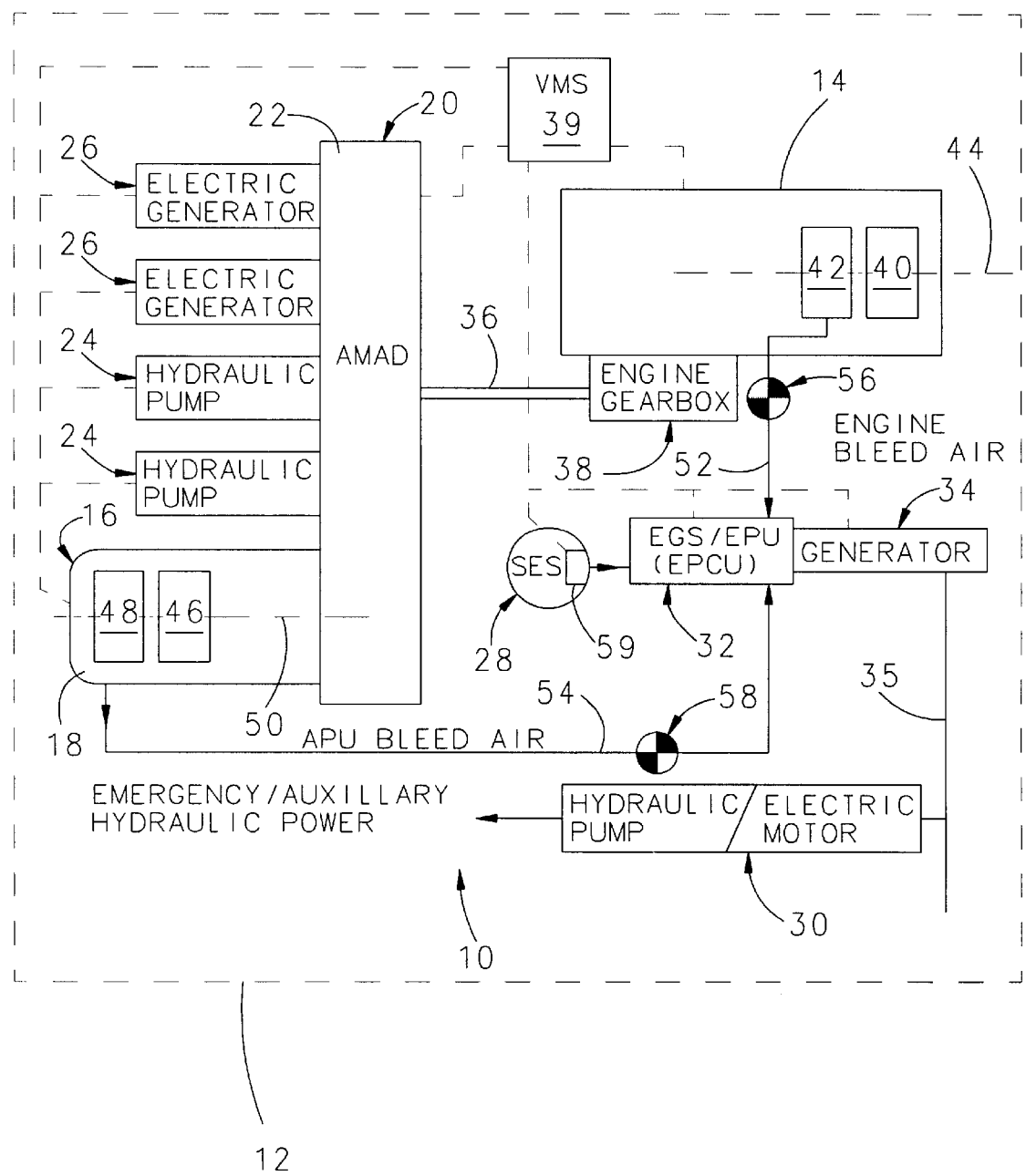
F I G. 1

INTEGRATED EMERGENCY POWER AND ENVIRONMENTAL CONTROL SYSTEM

FIELD OF THE INVENTION

This invention relates to environmental control and emergency power for vehicles carrying at least one gas turbine engine.

BACKGROUND OF THE INVENTION

It is common for vehicles, such as aircraft, that carry at least one gas turbine engine to include an environmental control system (ECS) for providing temperature conditioned, pressurized air to the pilot, passengers, and heat generating electronics; an auxiliary power unit (APU) to supply auxiliary power for the aircraft; and an emergency power unit (EPU) to provide emergency power from a self-contained fuel and/or oxidizer supply commonly known as a stored energy system (SES), which, typically, is insensitive to altitude and can be activated quickly for rapid starting of the EPU.

Typically, the APU, EPU and ECS are turbo machines. There is a continuing desire to integrate the functions of these various systems into a single turbo machine to reduce components and weight. However, some prior attempts to integrate these various systems have created unacceptable performance penalties, such as unacceptable rates of fuel usage, because the optimum turbo machines of each of the various functions are of different size, speed and configuration.

SUMMARY OF THE INVENTION

It is the principal object of the invention to provide a new and improved system for providing environmental control and emergency power to a vehicle carrying at least one gas turbine engine.

According to one aspect of the invention, environmental control and electric power are provided for a vehicle carrying at least one gas turbine engine having a power turbine and a compressor, a stored energy device, a first turbine powered by the stored energy device, an expansion turbine for an air-cooling cycle, and an electric generator rotatably driven by the first turbine and the expansion turbine. The electric generator has a minimum speed required to generate electric power for the vehicle. The environment control and electric power are provided by a method including the steps of normally rotating the expansion turbine with bleed air from the compressor of the at least one gas turbine engine to generate temperature conditioned, pressurized air for the environmental control of the vehicle, driving the electric generator above the minimum speed with the expansion turbine to provide electric power for the vehicle, and, in the absence of sufficient power from the expansion turbine, maintaining the electric generator above the minimum speed by powering the first turbine with the stored energy device to provide electric power for the vehicle.

According to another aspect of the invention, a combined power and environmental control system is provided for a vehicle carrying at least one gas turbine propulsion engine having a turbine and a compressor mounted for rotation about a first axis. The system includes an auxiliary power gas turbine engine having a turbine and a compressor mounted for rotation about a second axis, a mechanical transmission connectable to the propulsion engine and the auxiliary power gas turbine engine to transmit mechanical power between the propulsion engine and the auxiliary power gas turbine engine, at least one of a hydraulic pump and an electric generator rotatably driven by said mechanical transmission, a stored energy system, and an emergency power cooling unit. The emergency power cooling unit includes an expansion turbine rotatable about a third axis by bleed air from at least one of the compressors of the propulsion engine and the auxiliary power gas turbine engine, a power turbine fixed for rotation with the expansion turbine about the third axis and connected to the stored energy system to be powered thereby, and an electric generator including a rotor fixed for rotation with the expansion and power turbines about the third axis. The rotor and the expansion and power turbines are rotatable about the third axis independent of rotation of the turbines and compressors of the propulsion and auxiliary power gas turbine engines about their respective first and second axes.

Other objects and advantages will become apparent from the following specification taken in connection with the accompanying drawings.

BRIEF DESCRIPTION OF THE DRAWINGS

FIG. 1 is a diagrammatic representation of combined power and environmental control system for a vehicle carrying at least gas turbine propulsion engine;

DETAILED DESCRIPTION OF THE PREFERRED EMBODIMENTS

Figure 2:
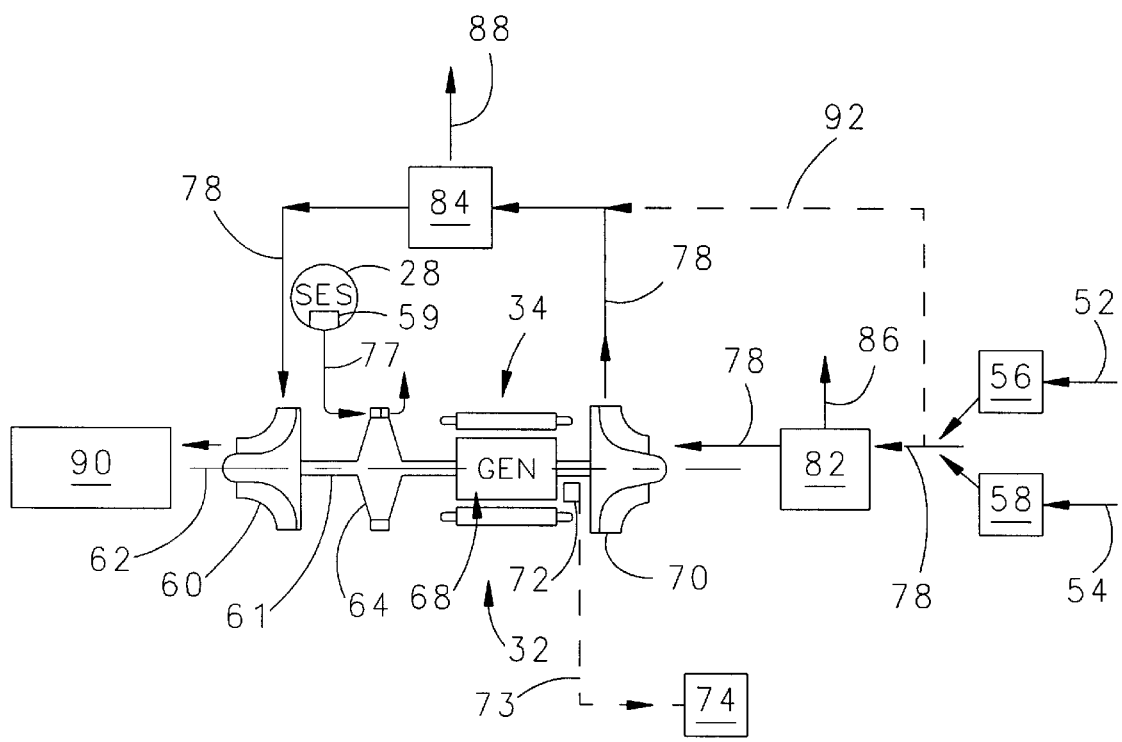
FIG. 2 is a diagrammatic representation of one embodiment of an emergency power cooling unit for use in the system of FIG. 1.

With reference to FIG. 1, the invention is illustrated in connection with a combined power and environmental control system 10 for a vehicle 12, such as an aircraft, that carries at least one gas turbine engine, such as an aircraft propulsion engine 14 or an auxiliary power gas turbine engine 16. However, it should be understood that the invention may find utility in a number of vehicles, and that no limitation to use with an aircraft, or an aircraft propulsion engine is intended except in so far as expressly stated in the appended claims.

The combined power and environmental control system includes the auxiliary power gas turbine engine 16 in the form of an auxiliary power unit (APU) 18, a mechanical transmission 20 in the form of an airframe mounted accessory drive (AMAD) 22, one or more hydraulic pumps 24 and/or electric generators 26 driven by the mechanical transmission 20, a stored energy system (SES) 28, an electric motor driven hydraulic pump 30, and an emergency power cooling unit (EPCU) 32 including a generator 34 electrically connected to the pump 30 and an electric bus 35 of the vehicle. As is often conventional, the mechanical transmission 20 is driven by a power take-off shaft 36 which in turn is driven by an engine mounted gear box 38 driven by the gas turbine engine 14. One or more controllers 39, such as a vehicle management system (VMS), are provided to monitor and control the components 14, 16, 20, 24, 26, 28, 30, 32, 34 and 35.

The mechanical transmission 20 is connected to the gas turbine engine 14 and the auxiliary power gas turbine engine 16 to transmit mechanical power between the engines 14 and 16, as is conventional. Additionally, again as is conventional, the mechanical transmission 20 is connected to the one or more hydraulic pumps 24 and/or electric generators 26 to transmit mechanical power from the gas turbine engines 14 and 16 to the pumps 24 and/or electric generators 26. Suitable components, such as bearings, gears, sprockets, chains, pulleys, belts, clutches, and torque converters, are included in the mechanical transmission to enable its power transmission functions.

The gas turbine engine 14 includes at least one turbine 40 and one compressor 42 mounted for rotation about a first axis 44. Similarly, the auxiliary power gas turbine engine 16 includes at least one turbine 46 and one compressor 48 mounted for rotation about an axis 50, as is commonly conventional. As shown by the conduit lines 52 and 54, respectively, either or both of the compressors 42 and 48 are connected to the EPCU 32 to provide bleed air for the operation of the EPCU 32. Bleed air control valves 56 and 58 are provided in the conduit lines 52 and 54, respectively, to control the flow of bleed air therethrough to the EPCU 32.

The SES 28 will typically include at least one tank for storing a fuel supply, such as a bi-propellant or mono-propellant, and, if required, one or more additional tanks for storing an oxidizer. While there are a number of known SES control means, control of the hot gas flow from the SES 28 is typically provided by a simple bang-bang control system wherein an on/off valve 59 pulses fuel to a catalyst bed or to a constant spark device.

In operation, the APU 18 is used for ground operations to provide hydraulic and/or electric power from the hydraulic pumps 24 and electric generators 26, respectively, by driving the hydraulic pumps 24 and electric generators 26 through the AMAD 22. Optionally, the APU 18 may be used for starting of the engine 14 by driving the engine 14 through the AMAD 21, the PTO 36, and the engine gear box 38. When the engine 14 is operating, power is transmitted via the engine gear box 38 and PTO shaft 36 to the mechanical transmission 20 which then transmits the power to the hydraulic pumps 24 and/or electric generators 26 for providing hydraulic and/or electric power to the various systems of the vehicle 12.

It will be appreciated that there are many known forms of gas turbine engines 14, auxiliary power gas turbine engines 16, mechanical transmissions 20, hydraulic pumps 24, electric generators 26, stored energy systems 28, power take off shafts 36, engine gear boxes 38, controllers 39, conduits 52 and 54, and valves 56 and 58 that are conventionally employed in, or could be employed in a vehicle such as the vehicle 12. The specific details of each of these components will be highly dependent upon the particular type of vehicle and its associated performance requirements. Accordingly, in the interest of brevity, specific details for each of these components will not be provided herein.

With reference to FIG. 2, one preferred embodiment of the EPCU 32 includes a radial flow expansion turbine 60 that is rotatable with a shaft 61 about an axis 62 by bleed air from at least one of the compressors 42 and 48, an axial flow power turbine 64 that is fixed for rotation with the shaft 61 and the expansion turbine 60 about the axis 62, the electric generator 34 including a rotor 68 that is fixed for rotation with the shaft 61 and the expansion and power turbines 60 and 64 about the axis 62, and a radial flow compressor 70 that is fixed for rotation with the shaft 61, the rotor 68, and the expansion and power turbines 60 and 64 about the axis 62. As is common, the rotor 68 of the generator 34 must be rotating above a predetermined, minimum operating speed for the generator 34 to provide acceptable electric power for the vehicle 12. The SES 28 is connected to the power turbine 64 to provide a relatively high-pressure gas flow when the SES 28 is activated or ignited, as shown at 71. A transducer 72, such as a magnetic speed pickup, is provided to generate a signal 73 indicative of the rotational speed of the components 60, 61, 64, 68 and 70 about the axis 62. The signal 73 is provided to a speed controller 74, either in the form of a dedicated controller or the VMS 39, which then provides control signals, as required, to the bleed air valves 56 and 58 and the stored energy system 28 to control the rotational speed of the components about the axis 62 in a closed-loop fashion. A suitable housing (not shown) is provided for the EPCU 32, and includes the appropriate bearings, manifolds, nozzles, lubrication systems, seals, etc., for each of the components 60, 61, 64, 34, 68, 70 and 72.

Figure 3:
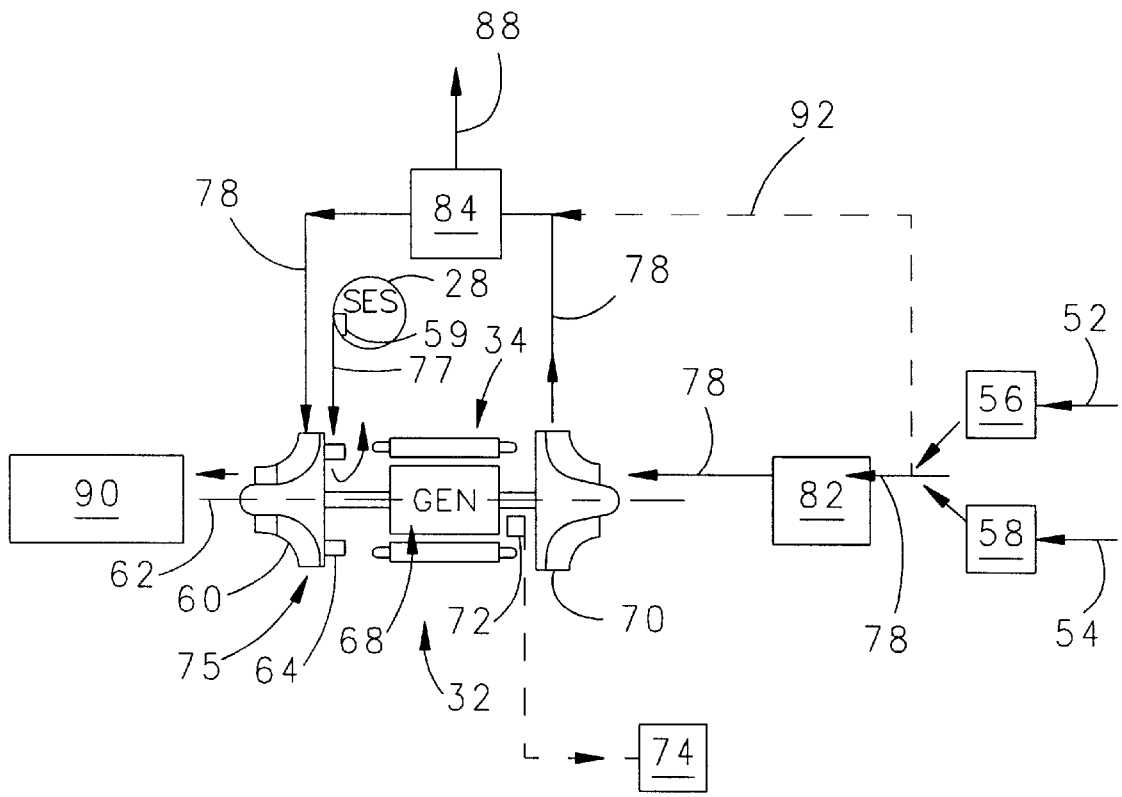
FIG. 3 is a diagrammatic representation of another embodiment of an emergency power cooling unit for use the system of FIG. 1.
Figure 4:
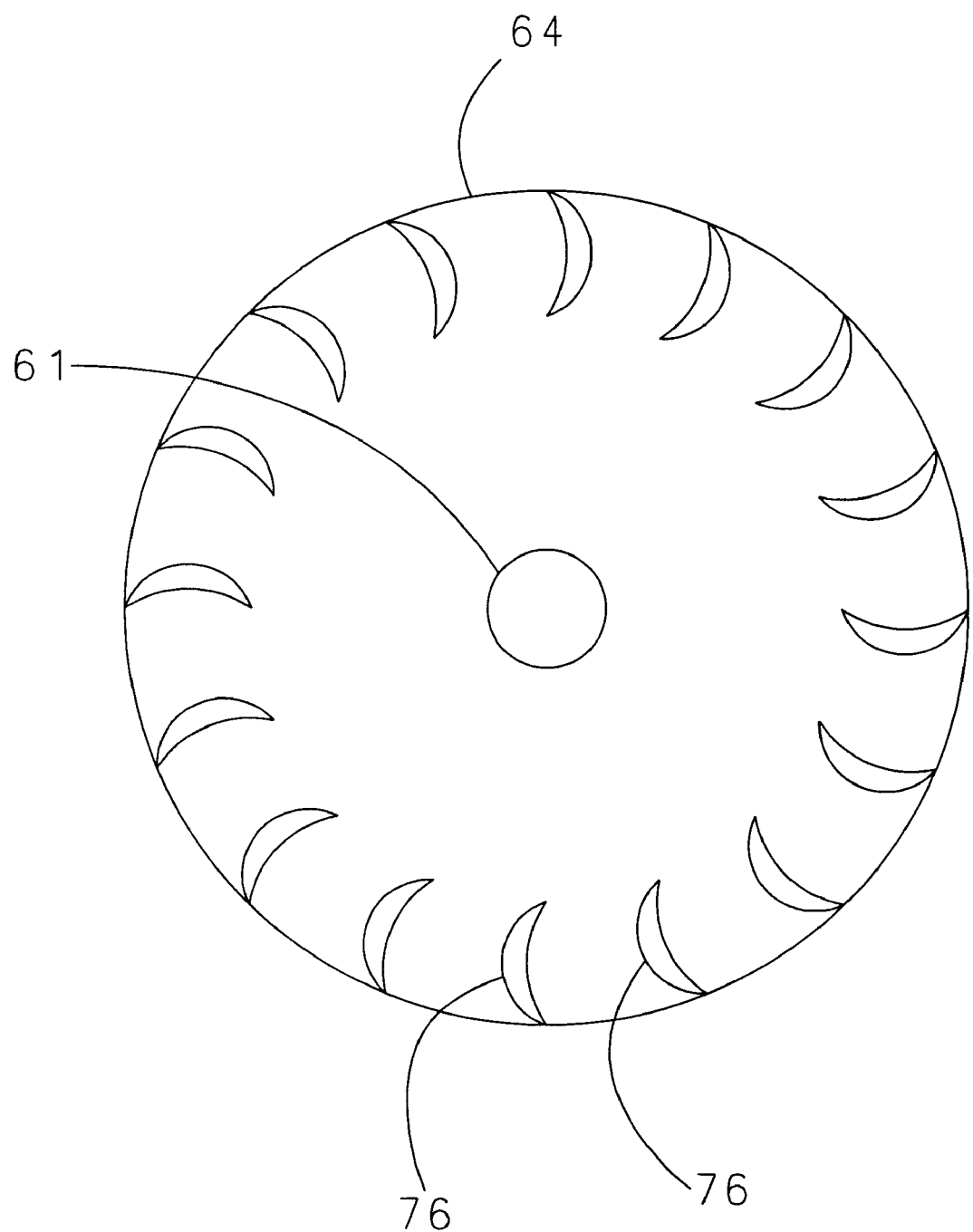
FIG. 4 is a diagrammatic representation taken from In. 4—4 in FIG. 3 of an integrated dual turbine.

FIGS. 3 and 4 illustrate another preferred embodiment of the emergency power control. This embodiment of the emergency power cooling unit 32 is identical to that shown in FIG. 2, except for the expansion turbine 60 and the power turbine 64. More specifically, in this embodiment of the EPCU 32, the expansion turbine 60 and the power turbine 64 are provided in the form of a mono-rotor 75, with the impulse turbine blades 76 of the power turbine 64 being situated to receive a radially inwardly directed flow of hot gas from the stored energy system 28, as shown at 77.

The emergency power cooling unit 32 has two modes of operation, an environmental control mode, which is the normal mode of operation for the EPCU 32, and an emergency power mode. In the environmental control mode of operation, the EPCU 32 uses bleed air from one or both of the engines 14 and 16 to provide temperature conditioned, pressurized air for the environmental control system of the vehicle 12, while continuously rotating the components 60, 64, 68, and 70 about the axis 62.

More specifically, during the normal operating modes of the APU 18 and the engine 14, bleed air from either, or both, of the compressors 42 and 48 is directed to the compressor 70 and then to the expansion turbine 60 via the control valves 56 and 58, and suitable conduits, ducting, guide vanes, and nozzles as shown at 78. One or more suitable heat exchangers 82 and 84 are provided in the flow path of the bleed air to reject heat therefrom, as shown at 86 and 88 prior to the bleed air entering the compressor 70 and the expansion turbine 60 respectively. The heat from the bleed air will be rejected through the heat exchangers 82 and 84 to a suitable heat sink in the vehicle 12, such as, for example, the fuel flow to one or both of the engines 14 and 16, the air stream passing by the vehicle 12, a ducted RAM air flow through the vehicle 12, and/or a bypass air flow through the engine 14. After passing through the heat exchanger 84, the bleed air is then expanded through the expansion turbine 60 to generate: a) rotational energy for continuously rotating the power turbine 64, the rotor 68, and the compressor 70, and b) temperature conditioned, pressurized air for the environmental control of the various heat loads 90 of the vehicle 12, such as for example, the vehicle's electronics and the vehicle's pilot/passenger compartments. In this regard, the VMS 39 actively controls the bleed air valves 56 and 58 to provide the air from the expansion turbine at an appropriate temperature and pressure while insuring that the components 60, 61, 64, 68 and 70 do not over speed. In the emergency power mode, the EPCU 32 provides emergency electric and/or hydraulic power when sufficient electric and/or hydraulic power are no longer available from the hydraulic pumps 24 and/or electric generators 26. While there are a number of scenarios wherein sufficient electric and/or hydraulic power are not available from the hydraulic pumps 24 and/or electric generators 26, such conditions will typically occur because of a failure, such as a failed PTO shaft 36, a failed component in the mechanical transmission 20, a failed APU 18, or a failed component in the generators 26 or hydraulic pumps 24.

Thus, it should be appreciated that during normal operation, the components 60,70, 82 and 84 provide what is commonly referred to as an air cooling cycle or air refrigeration cycle. In this regard, it should be understood that, because the bleed air has already been compressed before it leaves the compressors 42 and 48, the heat exchanger(s) 82 and the compressor 70 are optional and may be eliminated in other preferred embodiments of the emergency power cooling unit 32, as dictated by the particular requirements for the vehicle 12. In such embodiments, the bleed air would be directed by suitable conduits and/or ducting to the heat exchanger 84, as shown by the dashed 92 line.

The transition from the environmental control mode to the emergency power mode occurs when, based on the current power requirements of the vehicle 12, the VMS 39 detects insufficient electric and/or hydraulic power from the hydraulic pumps 24 and/or generators 26, and energizes the generator 34 so that it provides power to the electric bus 35 of the vehicle 12 and/or the electric motor driven hydraulic pump 30, again as dictated by the current requirements of the vehicle 12. In this mode, the signal from the transducer 72 is used in the closed loop speed control 74 to modulate the appropriate one, or both, of the bleed air valves 56 and 58 to maintain the rotational speed of the rotor 68 within its desired operating speed range to provide electric power of an acceptable quality to the vehicle 12. Because the rotor 68 was being continuously rotated in the environmental control mode, the EPCU 32 allows for a continuous supply of electric power and/or hydraulic power to the vehicle 12 even when there has been a relatively sudden drop in the supply of electric and/or hydraulic power from the hydraulic pumps 24 and/or generator 26. The same signal that energizes the generator 34 may also be used to enable the SES 28 so that it may be activated, if required, during the emergency power mode. In this regard, if the signal 73 from the transducer 72 indicates that the rotational speed of the rotor 68 has dropped below a predetermined speed set point above the minimum operating speed of the generator 34 and the bleed air valves 56 and 58 are fully open to provide the maximum bleed air flow currently available from the compressors 42 and 48, the vehicle management system 39 will detect these conditions and activate or ignite the SES 28 so that it begins producing high pressure gas to power the turbine 64 to maintain the rotor 68 above the minimum operating speed of the generator 34. It is anticipated that, in the preferred embodiment, the time period from detection of the appropriate conditions and the powering of the turbine 64 by the SES 28 by pulsing the valve 59 will be approximately one half of a second. Once the SES 28 is activated, the signal 73 from the transducer 72 is used by the speed control 74 to control the high pressure gas flow from the SES 28 to maintain the rotational speed of the rotor 68 within its desired operating speed range. In this manner, the speed of the electric generator 32 is maintained above the minimum operating speed to ensure a continuous supply of emergency electric power and/or hydraulic power for the vehicle, even under conditions where there is insufficient power from the expansion turbine 60 to maintain the generator 34 above its minimum operating speed.

It should be appreciated that there are many known forms of expansion turbines 60, shafts 61, power turbines 64, generators 34, rotors 68, compressors 70, transducers 72, speed controllers 74, bleed air valves 56 and 58, and heat exchangers 82 and 84 that are conventionally employed in, or could be employed in a vehicle such as the vehicle 12. The specific details of each of these individual components will be highly dependent upon the particular type of vehicle and its associated performance requirements. Accordingly, in the interest of brevity, specific details for each these components will not be provided herein.

It should also be appreciated that there are many possible variations of the system 10 within the spirit of the invention. For example, the mechanical transmission 20 could be provided in the form of an engine mounted accessory drive that is driven directly by the gas turbine engine 14, thereby eliminating the PTO shaft 36 and the engine gear box 38. By way of further example, the EPCU 32 can be operated in a vehicle having a single gas turbine engine 14 or 16.

By integrating the functions normally performed by conventional emergency power units and environmental control machines into a single turbo machine, the EPCU 32 allows for reduction in weight and components in comparison to known systems. Further, by continuously rotating the components 60, 64 and 68 of the EPCU 32, the system 10 can prevent the rotational speed of the generator 34 from falling below its minimum operating speed, thereby providing uninterrupted electric power to the vehicle 12. A uninterrupted flow of electrical power is becoming increasingly important for flight critical loads on modem military aircraft, including the vehicle management system of such aircraft.

What is claimed is:

1. A method of providing environmental control and electric power for a vehicle carrying a stored energy device, an electric generator, and at least one gas turbine engine having a turbine and a compressor, the electric generator having a minimum operating speed required to generate acceptable electric power for the vehicle, the method comprising the steps of:

normally expanding bleed air from said compressor of said at least one gas turbine engine to generate a) temperature conditioned, pressurized air for the environmental control of said vehicle, and b) rotational energy;

driving said electric generator above said minimum speed with said rotational energy from said bleed air to provide electric power for the vehicle;

in the absence of sufficient rotational energy from said bleed air, activating said stored energy device while said generator is still rotating above said minimum operating speed from said rotational energy; and maintaining said generator above said minimum operating speed with rotational energy generated from said stored energy device to provide electric power for the vehicle.

2. The method of claim 1 further comprising the step of driving a hydraulic pump with said electric power from said electric generator.

3. The method of claim 1 further comprising the step of driving an additional compressor with said rotational energy from said bleed air to further compress said bleed air prior to said expansion thereof.

4. The method of claim 1 further comprising the step of rejecting heat from said bleed air prior to said expansion thereof.

5. A method of providing environmental control and electric power for a vehicle carrying at least one gas turbine engine having a power turbine and a compressor, a stored energy device, a first turbine powered by the stored energy device, an expansion turbine for an air-cooling cycle, and an electric generator rotatably driven by said first turbine and said expansion turbine, the electric generator having a minimum operating speed required to generate acceptable electric power for the vehicle, the method comprising the steps of:

normally rotating said expansion turbine with bleed air from said compressor of said at least one gas turbine engine to generate temperature conditioned, pressurized air for the environment control of said vehicle;

driving said electric generator above said minimum operating speed with said expansion turbine to provide electric power for the vehicle; and in the absence of sufficient power from said expansion turbine, maintaining said electric generator above said minimum operating speed by powering said first turbine with said stored energy device to provide electric power for the vehicle.

6. The method of claim 5 further comprising the step of driving an additional compressor with said expansion turbine to further compress said bleed air before introducing said bleed air to said expansion turbine.

7. The method of claim 5 further comprising the step of rejecting heat from said bleed air before introducing said bleed air to said expansion turbine.

8. A combined power and environmental control system for a vehicle carrying at least one gas turbine propulsion engine having a turbine and a compressor mounted for rotation about a first axis, the system comprising:

an auxiliary power gas turbine engine including a turbine and a compressor mounted for rotation about a second axis;

a mechanical transmission connectable to the propulsion engine and the auxiliary power gas turbine engine to transmit mechanical power between the propulsion engine and the auxiliary power gas turbine engine;

at least one of a hydraulic pump and an electric generator rotatably driven by said mechanical transmission;

a stored energy system; and an emergency power cooling unit including
      an expansion turbine rotatable about a third axis by bleed air from at least one of the compressors of said propulsion engine and auxiliary power gas turbine engine,
      a power turbine fixed for rotation with said expansion turbine about said third axis and connected to said stored energy system to be powered thereby, and
      an electric generator including a rotor fixed for rotation with said expansion and power turbines about said third axis;
      wherein said rotor and said expansion and power turbines are rotatable about said third axis independent of rotation of said turbines and compressors of said propulsion and auxiliary power gas turbine engines about their respective first and second axes.

9. The system of claim 8 further comprising an electric motor driven hydraulic pump having an electric motor connected to said generator to receive electric power therefrom.

10. The system of claim 8 wherein said expansion turbine is rotatable about said third axis by bleed air from both the compressor of said propulsion engine and the compressor of said auxiliary power gas turbine engine.

* * * * *